United States Patent
Chiticariu et al.

(10) Patent No.: US 10,289,963 B2
(45) Date of Patent: May 14, 2019

(54) UNIFIED TEXT ANALYTICS ANNOTATOR DEVELOPMENT LIFE CYCLE COMBINING RULE-BASED AND MACHINE LEARNING BASED TECHNIQUES

(71) Applicant: International Business Machines Corporation, Armonk, NY (US)

(72) Inventors: Laura Chiticariu, San Jose, CA (US); Jeffrey Thomas Kreulen, San Jose, CA (US); Rajasekar Krishnamurthy, Campbell, CA (US); Prithviraj Sen, San Jose, CA (US); Shivakumar Vaithyanathan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 15/444,051

(22) Filed: Feb. 27, 2017

(65) Prior Publication Data
US 2018/0246867 A1    Aug. 30, 2018

(51) Int. Cl.
*G06F 17/00*    (2019.01)
*G06N 99/00*    (2019.01)
(Continued)

(52) U.S. Cl.
CPC ..... *G06N 99/005* (2013.01); *G06F 17/30705* (2013.01); *G06N 5/025* (2013.01); *G06F 17/241* (2013.01)

(58) Field of Classification Search
CPC ............... G06F 17/241; G06F 17/2765; G06F 17/30705; G06N 99/005; G06N 5/025
(Continued)

(56) References Cited

U.S. PATENT DOCUMENTS

| 6,044,370 A | 3/2000 | Anfindsen |
| 7,561,734 B1 * | 7/2009 | Wnek .................. G06F 17/243 |
| | | 382/159 |

(Continued)

FOREIGN PATENT DOCUMENTS

| CN | 102254014 A | 11/2011 |
| WO | WO9938095 A1 | 7/1999 |

OTHER PUBLICATIONS

Jin et al., OpinionMiner: A Novel Machine Learning System for Web Opinion Mining and Extraction, ACM 2009, pp. 1195-1205.*
(Continued)

*Primary Examiner* — Cong-Lac Huynh
(74) *Attorney, Agent, or Firm* — Ference & Associates LLC

(57) ABSTRACT

One embodiment provides a method for developing a text analytics program for extracting at least one target concept including: utilizing at least one processor to execute computer code that performs the steps of: initiating a development tool that accepts user input to develop rules for extraction of features of the at least one target concept within a dataset comprising textual information; developing, using the rules for feature extraction, an evaluation dataset comprising at least one document annotated with the at least one target concept to be extracted by the text analytics program; creating, using the rules for feature extraction, a rule-based annotator to extract the at least one target concept; training, using the evaluation dataset, a machine-learning annotator to extract the at least one target concept within the dataset; combining the rule-based annotator and the machine learning annotator to form a combined annotator; evaluating, using the evaluation dataset, extraction performance of the combined annotator against a predetermined threshold; and publishing, when the extraction performance of the combined annotator exceeds the predetermined threshold, the (Continued)

combined annotator for use in an application that extracts the at least one target concept from a plurality of datasets.

19 Claims, 6 Drawing Sheets

(51) Int. Cl.
*G06F 17/30* (2006.01)
*G06N 5/02* (2006.01)
*G06F 17/24* (2006.01)

(58) Field of Classification Search
USPC .................................................. 715/200, 230
See application file for complete search history.

(56) References Cited

U.S. PATENT DOCUMENTS

| | | | | |
|---|---|---|---|---|
| 9,164,981 | B2* | 10/2015 | Miyazaki | G06F 17/2785 |
| 2002/0091516 | A1* | 7/2002 | Matsuoka | G06F 21/6245 |
| | | | | 704/231 |
| 2006/0123000 | A1* | 6/2006 | Baxter | G06F 17/3061 |
| 2006/0253273 | A1* | 11/2006 | Feldman | G06F 17/2715 |
| | | | | 704/9 |
| 2008/0010274 | A1* | 1/2008 | Carus | G06N 99/005 |
| 2008/0133443 | A1* | 6/2008 | Bohannon | G06F 17/2705 |
| | | | | 706/48 |
| 2008/0162456 | A1* | 7/2008 | Daga | G06F 17/30675 |
| 2008/0195669 | A1 | 8/2008 | Yang | |
| 2009/0112867 | A1* | 4/2009 | Roy | G06F 17/30011 |
| 2014/0013220 | A1* | 1/2014 | Ohguro | G06F 17/22 |
| | | | | 715/256 |
| 2014/0245122 | A1* | 8/2014 | Oro | G06F 17/2785 |
| | | | | 715/230 |
| 2016/0085741 | A1* | 3/2016 | Blanchflower | G06F 17/278 |
| | | | | 704/9 |
| 2016/0103823 | A1* | 4/2016 | Jackson, Jr. | G06F 17/2705 |
| | | | | 704/9 |
| 2018/0033272 | A1* | 2/2018 | Hirayama | G08B 13/19656 |
| 2018/0357307 | A1* | 12/2018 | Sevenster | G06F 17/30713 |

OTHER PUBLICATIONS

Callan et al., Knowledge-based Extraction of Named Entities, ACM 2002, pp. 532-537.*
Chu et al., A Semantic-based Approach to Content Abstraction and Annotation for Content Management, ScienceDirect 2009, pp. 2360-2376. (Year: 2009).*
Park et al., OLYBIA: Ontology-based Automatic Image Annotation System Using Semantic Interference Rules, Springer 2007, pp. 485-496. (Year: 2007).*
Wright et al., Use of a Support Vector Machine for Categorizing Free-text Notes: Assessment of Accuracy across Two Institutions, Google Scholar 2013, pp. 887-890. (Year: 2013).*
ip.com, "Automatic Categorization of IT Infrastructure Service Management Data using Natural Language Processing and Machine Learning", ip.com, Feb. 18, 2016, 7 pages, ip.com No. IPCOM000245200D.
S. Chabou et al., "PICO Extraction by combining the robustness of machine-learning methods with the rule-based methods", 2015 World Congress on Information Technology and Computer Applications Congress (WCITCA), Jun. 11-13, 2015, Hammamet, Tunisia, 4 pages, IEEE Digital Library.
Aleksandar Kovacevic et al., "Combining rules and machine learning for extraction of temporal expressions and events from clinical narratives", Journal of the American Medical Informatics Association (J Am Med Inform Assoc), Sep./Oct. 2013, 8 pages, vol. 20, Issue 5, J Am Med Inform Assoc, Oxford, UK.

* cited by examiner

UNIFIED TEXT ANALYTICS ANNOTATOR DEVELOPMENT LIFE CYCLE COMBINING RULE-BASED AND MACHINE LEARNING BASED TECHNIQUES

BACKGROUND

Information Extraction (IE) is the task of automatically extracting structured information from unstructured text. A computer program that extracts such information is called an information extraction program (IE program), also known as extractor or annotator.

Information extraction can be broadly categorized into primarily "rule-based" and primarily "machine learning" (ML) or "statistical" based. Both rule-based and ML approaches have advantages and disadvantages. There is no primarily rule-based or primarily ML-based solution that fits all use-cases.

BRIEF SUMMARY

In summary, one aspect of the invention provides a method for developing a text analytics program for extracting at least one target concept comprising: utilizing at least one processor to execute computer code that performs the steps of: initiating a development tool that accepts user input to develop rules for extraction of features of the at least one target concept within a dataset comprising textual information; developing, using the rules for feature extraction, an evaluation dataset comprising at least one document annotated with the at least one target concept to be extracted by the text analytics program; creating, using the rules for feature extraction, a rule-based annotator to extract the at least one target concept; training, using the evaluation dataset, a machine-learning annotator to extract the at least one target concept within the dataset; combining the rule-based annotator and the machine learning annotator to form a combined annotator; evaluating, using the evaluation dataset, extraction performance of the combined annotator against a predetermined threshold; and publishing, when the extraction performance of the combined annotator exceeds the predetermined threshold, the combined annotator for use in an application that extracts the at least one target concept from a plurality of datasets.

Another aspect of the invention provides an apparatus comprising: at least one processor; and a computer readable storage medium having computer readable program code embodied therewith and executable by the at least one processor, the computer readable program code comprising: computer readable program code that initiates a development tool that accepts user input to develop rules for extraction of features of the at least one target concept within a dataset comprising textual information; computer readable program code that develops, using the rules for feature extraction, an evaluation dataset comprising at least one document annotated with the at least one target concept to be extracted by the text analytics program; computer readable program code that creates, using the rules for feature extraction, a rule-based annotator to extract the at least one target concept; computer readable program code that trains, using the evaluation dataset, a machine-learning annotator to extract the at least one target concept within the dataset; computer readable program code that combines the rule-based annotator and the machine learning annotator to form a combined annotator; computer readable program code that evaluates, using the evaluation dataset, extraction performance of the combined annotator against a predetermined threshold; and computer readable program code that publishes, when the extraction performance of the combined annotator exceeds the predetermined threshold, the combined annotator for use in an application that extracts the at least one target concept from a plurality of datasets.

An additional aspect of the invention provides a computer program product comprising: a computer readable storage medium having computer readable program code embodied therewith, the computer readable program code executable by a processor and comprising: computer readable program code that initiates a development tool that accepts user input to develop rules for extraction of features of the at least one target concept within a dataset comprising textual information; computer readable program code that develops, using the rules for feature extraction, an evaluation dataset comprising at least one document annotated with the at least one target concept to be extracted by the text analytics program; computer readable program code that creates, using the rules for feature extraction, a rule-based annotator to extract the at least one target concept; computer readable program code that trains, using the evaluation dataset, a machine-learning annotator to extract the at least one target concept within the dataset; computer readable program code that combines the rule-based annotator and the machine learning annotator to form a combined annotator; computer readable program code that evaluates, using the evaluation dataset, extraction performance of the combined annotator against a predetermined threshold; and computer readable program code that publishes, when the extraction performance of the combined annotator exceeds the predetermined threshold, the combined annotator for use in an application that extracts the at least one target concept from a plurality of datasets.

A further aspect of the invention provides a method comprising: utilizing at least one processor to execute computer code that performs the steps of: receiving user input identifying rules for extracting at least one target concept from at least one textual document; receiving a training dataset comprising a plurality of textual documents annotated with known features and concepts; creating at least two annotators for extracting the at least one target concept, wherein one of the at least two annotators comprises a rule-based annotator and wherein one of the at least two annotators comprises a machine-learning annotator; the rule-based annotator being defined using a plurality of simple rules and at least one pre-existing annotator; the machine-learning annotator being trained using at least one machine-learning algorithm, wherein the machine-learning algorithm is based, at least in part, on the plurality of simple rules and the at least one pre-existing annotator; evaluating, using the training dataset, the at least two annotators against a predefined threshold; and generating, when the at least two annotators meet the predefined threshold, a combined annotator comprising the evaluated at least two annotators.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
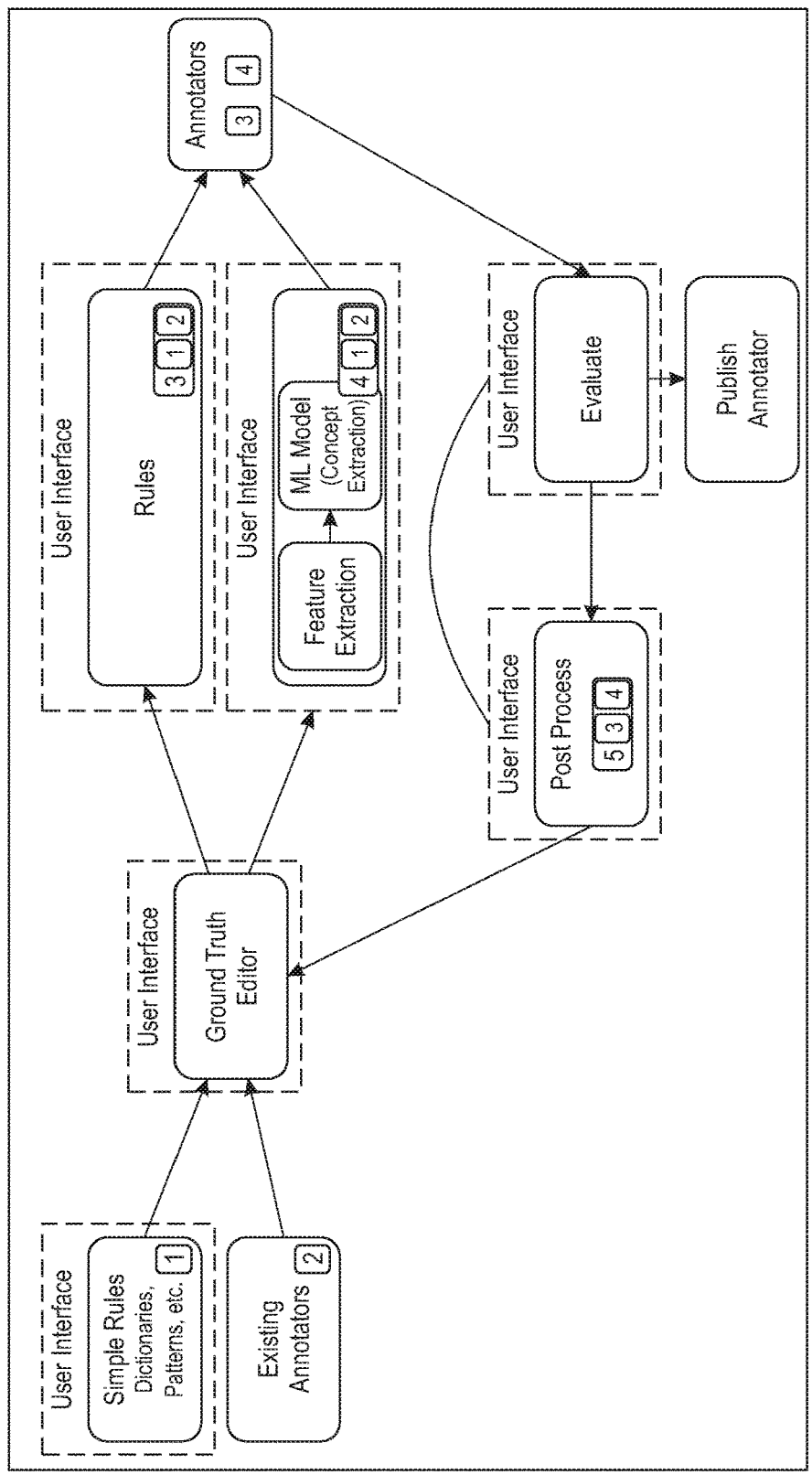
FIG. 1 illustrates an example of combined annotator development life cycle according to an embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

Conventional systems for developing information extraction rules and systems for training and applying machine learning models are independent and disconnected from each other. Developers build different parts of the information extraction solution (e.g., a rule-based annotator and a machine learning annotator) independently (using different systems) and connect them in a flow in an ad-hoc manner.

This poses a number of practical challenges, including the fact that manually designing, training, customizing and maintaining such an extraction flow is labor-intensive, as developers must switch between different systems. Moreover, unified tooling for iteratively developing, training and testing the extraction flow in its entirety is lacking. Further, ad-hoc extraction flows are often designed from the bottom up, e.g., without benefiting from an upfront, higher-level model of the application requirements. Scaling out on a single platform often proves difficult, as different pieces with different scale-out mechanisms are connected in an ad-hoc fashion.

Referring now to FIG. 1, an embodiment provides an annotator development life cycle (ADLC), which is a methodology for developing a combined annotator that comprises both rules and ML techniques (noting that an "annotator" generally is also referred to herein as an information extraction (IE) program or extractor).

An overview of an ADLC is shown in FIG. 1. Once a user decides there is an interest in extracting a specific target concept (e.g., extracting proper names, extracting a specific sentence structures, extracting dates, etc.) from a document or set of documents, an embodiment provides an iterative process involving multiple steps for developing a combined annotator to extract at least one target concept. It should be understood that a target concept may consist of any kind of information extraction task, for example, extracting entities, relationships, events, sentiments, and the like, or various attributes of entities, relationships, events, sentiments, and the like. The developer of the combined annotator will go through these steps, possibly in multiple iterations, until the resulting combined annotator has the desired quality.

As outlined in FIG. 1, steps of the combined annotator development process include developing rules for extraction of at least one target concept. In FIG. 1, the rules for extraction are indicated at 1, and an embodiment provides a user interface in which input data from the user are supplied to form or change the rules 1. As an example, a rule may include a regular expression, a dictionary of terms, parts of speech, or simple patterns that are associated with the target concept of interest. A user may input these rules or select from among predetermined rules available within the system.

An embodiment also supplies one or more pre-existing annotators, indicated at 2 in FIG. 1. The pre-existing annotator(s) 2 are, for example, provided as a catalogue of annotators that are available for use in the system. In an embodiment, a user interface is provided for accepting user input to form or modify an existing annotator, (e.g., as supplied for example by a developer or a prior user, etc.).

An evaluation dataset (also referred to herein as ground truth or standard) is created by a user, developed by the system, or provided by a user or the system as indicated in FIG. 1. The ground truth or standard comprises an evaluation dataset that is formed by labelling or annotating one or more documents with known language features. For example, the one or more documents may be highlighted or labelled by a user with language concepts. The one or more documents may also be automatically annotated by a pre-existing or user generated annotator. In an embodiment, a user may supply labels to target concepts within the evaluation or standard dataset. In an embodiment, the rules 1 and pre-existing annotator(s) 2 may be used to pre-label the standard dataset. Thus, rather than requiring a user to read an entire document to pick out and label features of interest, a rule set 1 and/or a pre-existing annotator 2 may be applied to the standard dataset to pinpoint regions of the document where the target concept occurs, such that the user need only confirm that the pre-labelling of the standard dataset is accurate. The standard dataset may comprise two parts, e.g., a train dataset that may be reserved for actual development of an annotator, a test dataset that may be reserved for evaluating the quality of an annotator, and the like.

An embodiment facilitates creating annotators for extracting one or more target concepts by defining an annotator consisting entirely of information extraction rules, for example, a rule-based annotator as indicated at 3 in FIG. 1, and/or by defining an annotator by training a machine learning algorithm, as indicated at 4 in FIG. 1, using the standard dataset. Defining or training the annotator may be completed using the train dataset. The rules for extracting features may involve simple rules, as indicated at 1 in FIG. 1, may involve use of the pre-existing annotator(s) 2 as building blocks, and the like. Similarly, the features for training the machine-learning model may involve the simple rules indicated at 1 in FIG. 1 and/or the pre-existing annotator(s) 2.

The rule-based annotator 3 and the machine learning based annotator 4 may then be evaluated using the evaluation dataset. For example, the annotators may be evaluated using the test dataset, as indicated in FIG. 1. This permits a user to see, e.g., via a user interface that displays the results of the annotators 3, 4, which of the annotators is or is not performing as desired, for example, if the annotator is or is not extracting one or more target concepts in the test dataset. The annotators may be evaluated against a predetermined or predefined threshold. For example, using the evaluation dataset, a user can identify whether the annotators have accurately annotated the dataset. For example, the user may set a particular threshold for accuracy which may then be used to determine whether the annotators are acceptable. As another example, the annotators may be evaluated against a known dataset or the results from another annotator. As a further example, a user may manually review the results of the annotator(s) to determine if the results are acceptable. Accordingly, the predetermined threshold may be any user or system value for evaluating the annotators.

An embodiment facilitates the combining of the rule-based annotator 3 and the machine-learning based annotator 4 into a resultant combined annotator 5. The combined annotator 5 contains features of both the rule-based annotator 3 and the machine learning annotator 4.

The combined annotator 5 is therefore available for evaluation, for example, using the test dataset, against a known annotator, and the like. If the quality and/or accuracy is of the combined annotator 5 is acceptable, e.g., it accurately and reliably extracts a target concept on the test dataset, the combined annotator 5 may be published. Otherwise, if the combined annotator does not exceed a minimum performance threshold, as determined, for example, by the user reviewing results of the combined annotator's 5 operation on the test dataset, as compared against a predetermined threshold, and the like, a user may perform another iteration of the process, e.g., by performing one or more of the formation steps. That is, a user may again develop simple rules 1, select another pre-existing annotator 2, provide more labelling data, develop more rules 3 or re-train the machine learning model 4, proceed through the evaluation steps and thus produce a refined, combined annotator.

An embodiment provides a set of user interfaces, as for example indicated in FIG. 1, that guide a user through the development of a combined annotator via a model of application requirements represented as an ontology. This enables use of pre-existing annotators and results in an annotator that itself is ready for an application. Multiple graphical user interfaces for combined annotator development are provided to assist the user in designing, training, evaluating and publishing a combined annotator, as further described herein.

Figure 2:
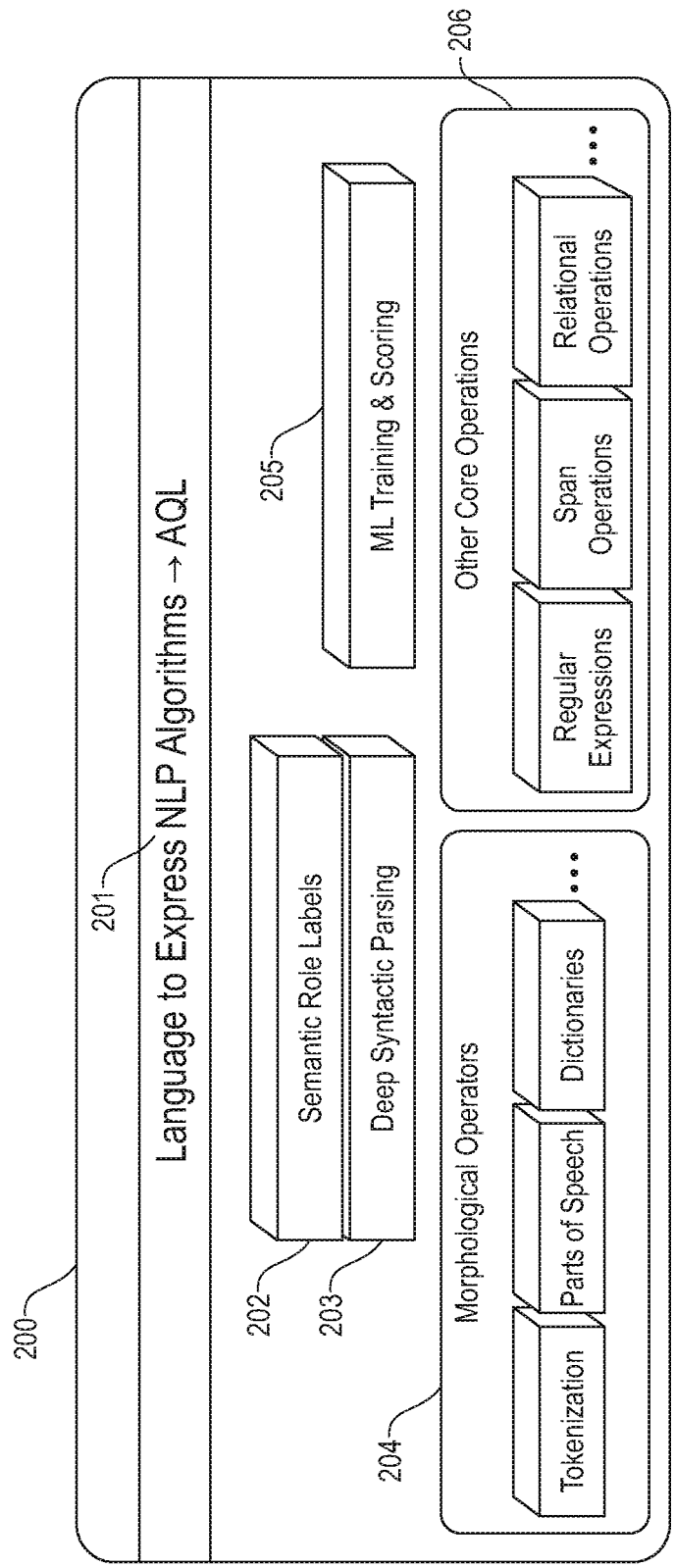
FIG. 2 illustrates an example integrated language runtime for combined annotator development according to an embodiment.

Generally, a system facilitating the development of a combined annotator includes two parts. First, a target language is provided that supports specification of both rule-based and machine learning based primitives. In an embodiment, such a target language can be an integrated language runtime (ILRT) 200 as depicted in FIG. 2. Additionally, the system includes a graphical user interface (GUI) that enables a user to effectively develop the combined annotator by following the methodology outlined in FIG. 1. Two such GUIs designs are described by way of example herein with reference to FIG. 1 and FIG. 3.

FIG. 2 illustrates an example implementation of an ILRT 200 to produce a combined annotator. The ILRT 200 depicted in FIG. 2 is a specification language for specifying annotators that combine rule-based and ML-based techniques, including a language to express natural language processing (NLP) algorithms by combining core primitives and existing extractors, and existing annotators written in the ILRT.

Core primitives include, for example, morphological processing including tokenization, part of speech detection, finding matches in dictionaries, and the like. Other core primitives include finding matches of regular expressions, performing span operations and relational operations, deep parsing and semantic role labelling, as well as machine learning primitives to call a machine learning algorithm for training and scoring.

An annotator written in the ILRT 200 can be automatically scaled out to multiple scale out platforms. The ILRT 200 builds upon existing capabilities of systems originally designed for rule-based or machine learning based techniques, e.g., SystemT rule based information extraction engine and SystemML machine learning system.

The different primitives (noted above) are available in the ILRT 200 by providing a language 201, e.g., annotation query language (AQL), to express NLP algorithms. Morphological processing 204 including tokenization and part of speech detection is exposed in the AQL language 201 via embedding software. Semantic role labels 202 and deep syntactic parsing 203 are available in AQL 201 via an AQL library (e.g., a set of pre-compiled AQL modules) that embeds a syntactic parser and a semantic parser. Other parser(s) can be embedded and exposed through the same interface.

Machine learning algorithms for ML training and scoring (205) are embedded in AQL via the AQL table user defined function mechanism (user defined functions, UDFs). An embodiment enables algorithms written in the SystemML machine learning system, but other suitable machine learning algorithm(s) may be embedded via the AQL table user defined function mechanism. Other core operations 206, e.g., regular expressions, dictionaries, span operations, relational operations, etc., are expressed in AQL using the select and extract statements in AQL.

Existing annotator support is offered for annotators written in ILRT 200 (e.g., using the AQL language in the example of FIG. 2) and exported as a set of compiled AQL modules. If only ILRT 200 pre-existing annotators are used, the resultant published combined annotator is an ILRT annotator comprising a set of compiled AQL modules. Non-ILRT annotators (e.g., built using unstructured information management architecture, UIMA) may be used; however, the publishing mechanism will be appropriately matched (e.g., UIMA pipeline consisting of two components, for example, the non-ILRT existing annotator and the ILRT annotator built using the methodology outlined in FIG. 1).

Figure 3:
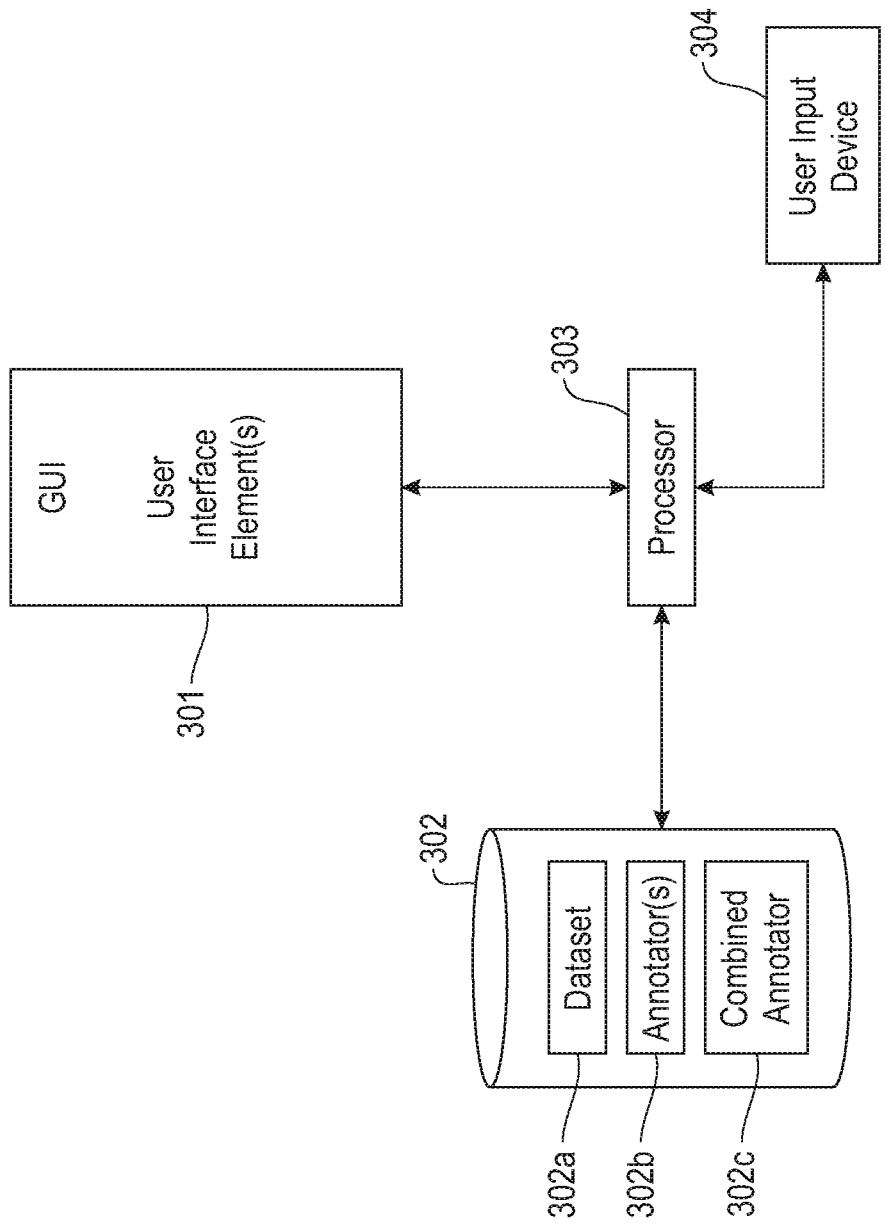
FIG. 3 illustrates an apparatus for producing a combined annotator according to an embodiment.

Referring to FIG. 3, in addition to ILRT 200 itself, implementation of the methodology outlined in FIG. 1 can be realized by providing different tooling environments on top of ILRT 200. Two different kinds of tooling environments for different kinds of users are described herein by way of example.

Referring back briefly to FIG. 1, NLP engineers are developers with extensive NLP expertise who are capable in writing code. Therefore, such NLP engineers or like users will develop combined annotators using ILRT 200 directly, e.g., by directly writing (AQL) code using a user interface provided for each step of the development, as indicated in FIG. 1.

Generally, and referring to FIG. 3, the tooling environment can thus consist of an editor for writing AQL code that is presented in a GUI 301, with additional capabilities (user interface element(s)) for labeling ground truth and evaluating annotators. Alternatively, a GUI having user interface elements may be provided, e.g., for making selections by users having less coding experience, as further described herein.

As shown in FIG. 3, a user capable of writing AQL code may be provided with a GUI 301 that provides an editor for the same, such that the user may operate a user input device 304 for writing the AQL code, along with system access to a dataset 302a for testing or evaluating, using a system processor 303, a combined annotator 302c formed of one or more pre-existing annotators 302b.

Figure 4:
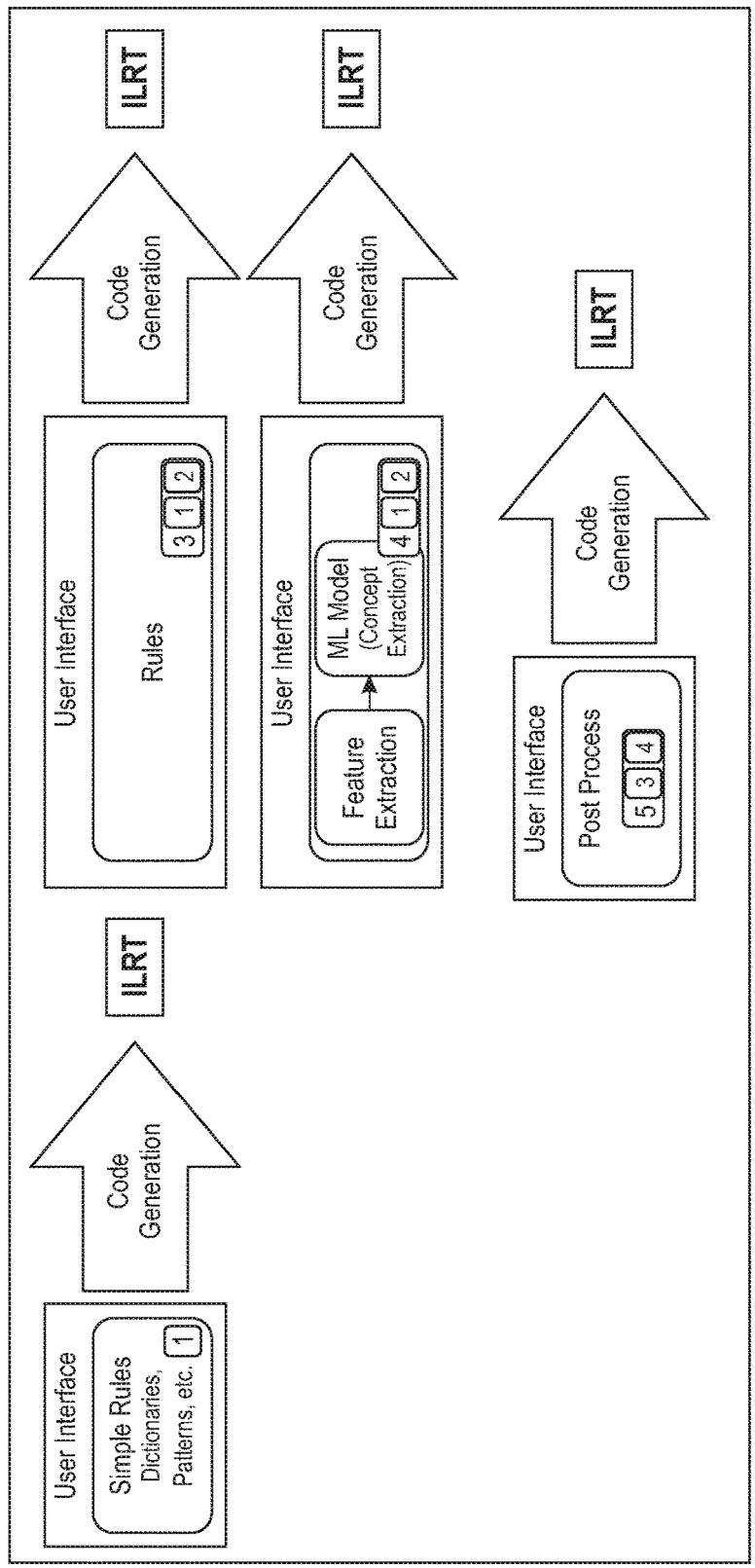
FIG. 4 illustrates an example of automatic code generation for translating user interface selections into code for an integrated language runtime according to an embodiment.

On the other hand, and referring to FIG. 4, a different kind of user may not have the capability required to write code directly. For such users, a user interface (or set thereof, as indicated in FIG. 4) includes options of specifying rules (e.g., those indicated at 1 and 3 of FIG. 4) from a predefined list, choosing features and ML algorithms (e.g., indicated at 4 in FIG. 4) from pre-defined lists of features and respective algorithms, and specifying post process rules (e.g., indicated at 5 of FIG. 4) from a predefined list. To enable such user interfaces, a component for automatic code generation is provided in order to translate the user interface choices or selections made by the user in a user interface into code for the ILRT 200.

Figure 5:
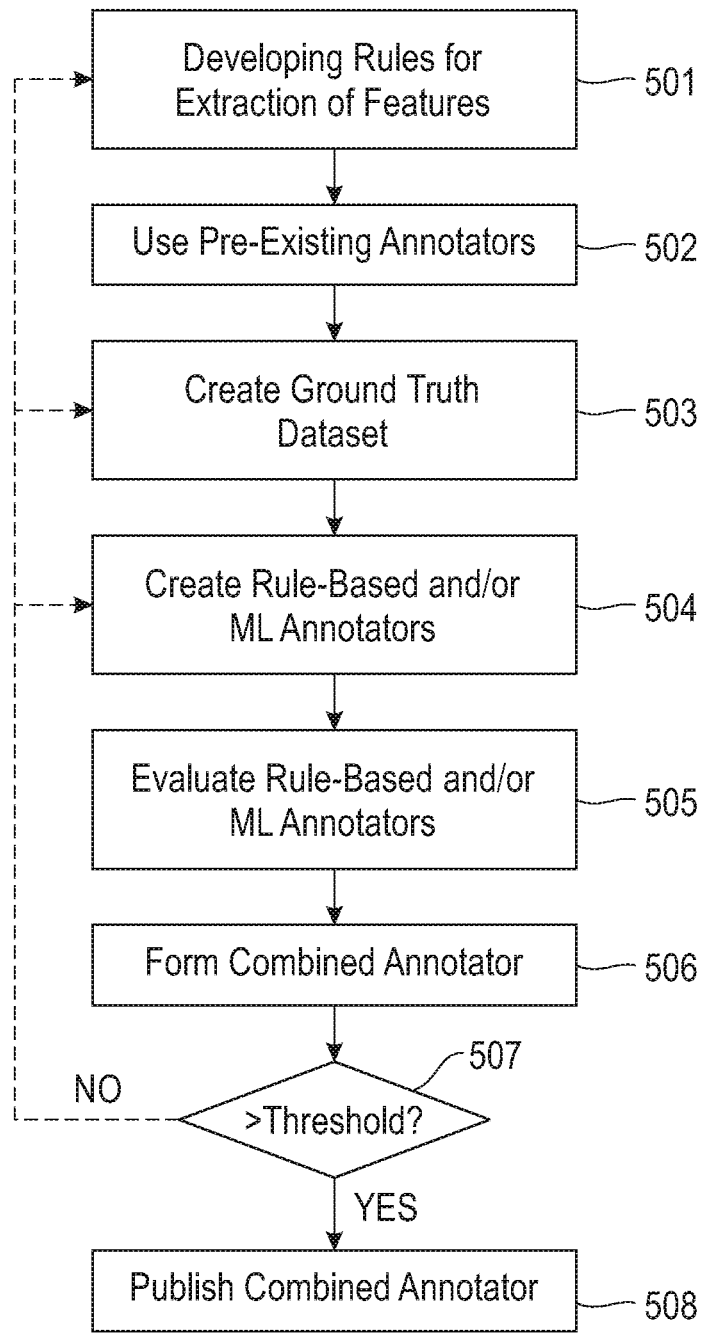
FIG. 5 illustrates an example method of producing a combined annotator according to an embodiment.

FIG. 5 provides an example method for using the methodology outlined in FIG. 1. As illustrated, a user (developer, novice user, etc.) develops rules for extraction of features at 501. As described herein, this may include an advance user actually writing rules or may include a user making choices as to which pre-existing rules are to be invoked. As shown at 502, one or more pre-existing annotators may be used to provide either rule-based and/or machine learning based extraction, e.g., of features to be used in the development of the annotator for the target concept of interest.

A ground truth or test dataset is created at 503, e.g., a user provides or confirms labels or annotations in a dataset that is used for training and testing of annotators and a combined annotator. At 504 the rule-based and machine learning based annotators are created. These annotators are evaluated, e.g., against a predetermined threshold or a user's subjective evaluation, as illustrated at 505. These annotators are then combined to form a combined annotator at 506.

The combined annotator is evaluated, again against one or more predetermined metrics/thresholds or against a user's subjective evaluation, as indicated at 507. If the combined annotator is suitable, the combined annotator may be published at 508. Otherwise, a user may iterate through one or more of the previous steps to form a refined, combined annotator, as illustrated in FIG. 5.

Figure 6:
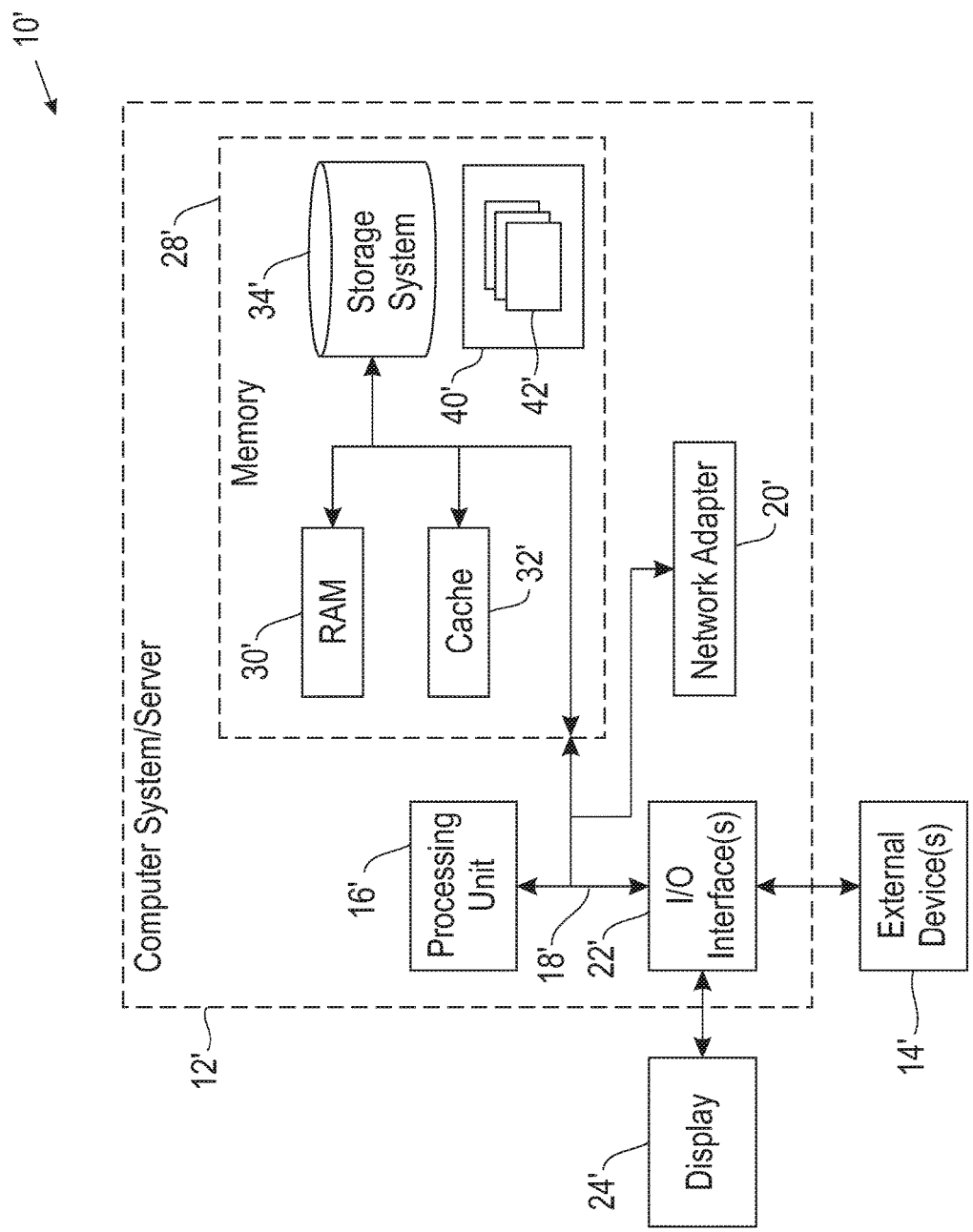
FIG. 6 illustrates a computer system.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for developing a text analytics program for extracting at least one target concept comprising:
    utilizing at least one processor to execute computer code that performs the steps of:
    initiating a development tool that accepts user input to develop rules for extraction of features of the at least one target concept within a dataset comprising textual information;
    developing, using the rules for feature extraction, an evaluation dataset comprising at least one document annotated with the at least one target concept to be extracted by the text analytics program;
    creating, using the rules for feature extraction, a rule-based annotator to extract the at least one target concept;
    training, using the evaluation dataset, a machine-learning annotator to extract the at least one target concept within the dataset;
    evaluating each of the rule-based annotator and the machine-learning annotator against the evaluation dataset and comparing the extraction results, of each of the rule-based annotator and the machine-learning annotator, from the evaluation against a threshold for accuracy;
    combining, responsive to determining each of the rule-based annotator and the machine-learning annotator meet the threshold for accuracy, the rule-based annotator and the machine-learning annotator to form a combined annotator having features from both of the rule-based annotator and the machine-learning annotator;
    evaluating, using the evaluation dataset, extraction performance of the combined annotator against a predetermined threshold; and
    publishing, when the extraction performance of the combined annotator exceeds the predetermined threshold, the combined annotator for use in an application that extracts the at least one target concept from a plurality of datasets.

2. The method of claim 1, wherein, in response to the extraction performance of the combined annotator being below the predetermined threshold, performing one of the following: iterating through one or more of the initiating, developing, creating, training, combining, and evaluating to form a refined, combined annotator.

3. The method of claim 1, wherein one or more of the rule-based annotator and the machine learning annotator are based on one or more pre-existing annotators that is available from a catalog of annotators stored in memory.

4. The method of claim 1, wherein the training dataset is annotated using one or more pre-existing annotators available from a catalog of annotators stored in memory.

5. The method of claim 1, wherein the evaluation dataset comprises a testing dataset and a training dataset.

6. The method of claim 5, wherein the training a machine-learning annotator comprises using the training dataset.

7. The method of claim 5, wherein the testing dataset is reserved for testing an annotator selected from the group consisting of the rule-based annotator and the machine learning annotator.

8. The method of claim 1, wherein the user input comprises at least one rule selected from the group consisting of: a regular expression, a dictionary of terms, parts of speech, and simple patterns.

9. The method of claim 1, comprising providing a user interface for creating the combined annotator.

10. The method of claim 9, wherein the user interface comprises graphical display elements facilitating formation of the combined annotator.

11. An apparatus for developing a text analytics program for extracting at least one target concept, comprising:
    at least one processor, and
    a computer readable storage medium having computer readable program code embodied therewith and executable by the at least one processor, the computer readable program code comprising:
    computer readable program code that initiates a development tool that accepts user input to develop rules for extraction of features of the at least one target concept within a dataset comprising textual information;
    computer readable program code that develops, using the rules for feature extraction, an evaluation dataset comprising at least one document annotated with the at least one target concept to be extracted by the text analytics program;
    computer readable program code that creates, using the rules for feature extraction, a rule-based annotator to extract the at least one target concept;
    computer readable program code that trains, using the evaluation dataset, a machine-learning annotator to extract the at least one target concept within the dataset;

computer readable program code that evaluates each of the rule-based annotator and the machine-learning annotator against the evaluation dataset and compares the extraction results, of each of the rule-based annotator and the machine-learning annotator, from the evaluation against a threshold for accuracy;

computer readable program code that combines, responsive to determining each of the rule-based annotator and the machine-learning annotator meet the threshold for accuracy, the rule-based annotator and the machine-learning annotator to form a combined annotator having features from both of the rule-based annotator and the machine-learning annotator;

computer readable program code that evaluates, using the evaluation dataset, extraction performance of the combined annotator against a predetermined threshold; and computer readable program code that publishes, when the extraction performance of the combined annotator exceeds the predetermined threshold, the combined annotator for use in an application that extracts the at least one target concept from a plurality of datasets.

12. A computer program product comprising:

a computer readable storage medium having computer readable program code embodied therewith, the computer readable program code executable by a processor and comprising:

computer readable program code that initiates a development tool that accepts user input to develop rules for extraction of features of the at least one target concept within a dataset comprising textual information;

computer readable program code that develops, using the rules for feature extraction, an evaluation dataset comprising at least one document annotated with the at least one target concept to be extracted by the text analytics program;

computer readable program code that creates, using the rules for feature extraction, a rule-based annotator to extract the at least one target concept;

computer readable program code that trains, using the evaluation dataset, a machine-learning annotator to extract the at least one target concept within the dataset;

computer readable program code that evaluates each of the rule-based annotator and the machine-learning annotator against the evaluation dataset and compares the extraction results, of each of the rule-based annotator and the machine-learning annotator, from the evaluation against a threshold for accuracy;

computer readable program code that combines, responsive to determining each of the rule-based annotator and the machine-learning annotator meet the threshold for accuracy, the rule-based annotator and the machine-learning annotator to form a combined annotator having features from both of the rule-based annotator and the machine-learning annotator;

computer readable program code that evaluates, using the evaluation dataset, extraction performance of the combined annotator against a predetermined threshold; and computer readable program code that publishes, when the extraction performance of the combined annotator exceeds the predetermined threshold, the combined annotator for use in an application that extracts the at least one target concept from a plurality of datasets.

13. The computer program product of claim 12, wherein, responsive to the extraction performance of the combined annotator being below the predetermined threshold, performing one of the following: iterating through one or more of the initiating, developing, creating, training, combining, and evaluating to form a refined, combined annotator.

14. The computer program product of claim 12, wherein one or more of the rule-based annotator and the machine learning annotator are based on one or more pre-existing annotators available from a catalog of annotators stored in memory.

15. The computer program product of claim 12, wherein the training dataset is annotated using one or more pre-existing annotators that is available from a catalog of annotators stored in memory.

16. The computer program product of claim 12, wherein the evaluation dataset comprises a testing dataset and a training dataset and wherein the training a machine-learning annotator comprises using the training dataset.

17. The computer program product of claim 12, wherein the evaluation dataset comprises a testing dataset and a training dataset and wherein the testing dataset is reserved for testing an annotator selected from the group consisting of the rule-based annotator and the machine learning annotator.

18. The computer program product of claim 12, wherein the user input comprises at least one rule selected from the group consisting of: a regular expression, a dictionary of terms, parts of speech, and simple patterns.

19. The computer program product of claim 12, comprising providing a user interface for creating the combined annotator.

* * * * *